United States Patent [19]
Kesseli et al.

[11] Patent Number: 5,586,429
[45] Date of Patent: Dec. 24, 1996

[54] BRAYTON CYCLE INDUSTRIAL AIR COMPRESSOR

[75] Inventors: James B. Kesseli, Mont Vernon, N.H.; Stephen P. Baldwin, Charlotte, N.C.

[73] Assignee: Northern Research & Engineering Corporation, Woburn, Mass.

[21] Appl. No.: 359,259

[22] Filed: Dec. 19, 1994

[51] Int. Cl.[6] .................................................. F02C 7/00
[52] U.S. Cl. ............................... 60/39.07; 60/39.33
[58] Field of Search .......................... 60/39.02, 39.07, 60/39.23, 39.29, 39.511, 39.33

[56] References Cited

U.S. PATENT DOCUMENTS

| | | |
|---|---|---|
| 2,438,635 | 3/1948 | Haverstick . |
| 2,463,964 | 3/1949 | Graf . |
| 2,464,861 | 3/1949 | Haverstick . |
| 2,477,184 | 7/1949 | Imbert et al. . |
| 2,483,073 | 9/1949 | Strub . |
| 2,714,670 | 8/1955 | Linder et al. . |
| 2,932,452 | 4/1960 | Parker et al. .......................... 60/39.07 |
| 3,261,659 | 7/1966 | Schwichtenberg et al. ........... 60/39.07 |
| 3,324,652 | 6/1967 | Maillet . |
| 3,365,121 | 1/1968 | Phillips . |
| 3,498,593 | 3/1970 | Kellett et al. . |
| 3,541,790 | 11/1970 | Kellett . |
| 3,543,511 | 12/1970 | Kellett . |
| 3,668,884 | 6/1972 | Nebgen . |
| 3,765,170 | 10/1973 | Nakamura . |
| 4,622,757 | 11/1986 | Bernstein et al. . |
| 4,858,428 | 8/1989 | Paul . |
| 5,287,916 | 2/1994 | Miller . |
| 5,323,603 | 6/1994 | Malohn . |
| 5,353,597 | 10/1994 | Faulkner et al. . |
| 5,363,641 | 11/1994 | Dixon et al. .......................... 60/39.07 |

FOREIGN PATENT DOCUMENTS

| | | |
|---|---|---|
| 0319849A1 | 6/1989 | European Pat. Off. . |
| 601964 | 3/1926 | France . |
| 531997 | 5/1942 | Germany . |
| 60261936 | 12/1982 | Japan . |
| 61-108832 | 5/1986 | Japan . |
| 04043823 | 2/1993 | Japan . |
| 604114 | 6/1948 | United Kingdom ................... 60/39.07 |
| 730126 | 5/1955 | United Kingdom ................... 60/39.07 |

OTHER PUBLICATIONS

Tony France, The Technical Page, The Financial Times, Apr. 6, 1972.

*Primary Examiner*—Louis J. Casaregola
*Attorney, Agent, or Firm*—Michael H. Minns

[57] ABSTRACT

A Brayton cycle air compressor system having two turbine-compressors and a recuperated combustion chamber interconnected. A portion of the hot compressed high pressure air is used as combustion air for the combustion chamber. In addition, a portion of the combustion air is used as the heat source for regenerating the desiccant in the air dryers.

10 Claims, 3 Drawing Sheets

BRAYTON CYCLE INDUSTRIAL AIR COMPRESSOR

BACKGROUND OF THE INVENTION

This invention relates generally to air compressors and more particularly to gas turbine powered oil-free air compressors.

A typical industrial air compression system is shown in FIG. 1. A prime mover 10, which can be an electric motor or an internal combustion piston engine, is connected by a gear coupling 12 to a compressor 20. The compressor 20, typically a multi-stage intercooled compressor, can be a piston compressor, screw compressor or centrifugal compressor. Inlet air 22 is provided to the compressor 20 though an inlet air filter. After being compressed, the compressed air is normally cooled in an aftercooler 25. The cooled compressed air is then delivered to an air receiver or storage tank 50 from which the compressed air flows into an air distribution system 52.

When additional drying of the compressed air is required, the compressed air is processed through a dryer system 30. FIG. 1 shows a typical two tank desiccant dryer system. The dryer system 30 consists of two tanks 34a, 34b and associated valving, one system designated "a" and the other system designated "b" (Open valves are shown as "O" and closed valves are shown as "C"). As shown in FIG. 1, the "a" system is being regenerated and the "b" system is in service. Supply air inlet valves 36a, 36b direct the compressed air to the in-service tank 34a, 34b where a moisture absorbing desiccant absorbs moisture from the cooled compressed air. Supply air outlet valves 38a, 38b, direct the discharge of the in-service tank to the air receiver 50. Regeneration air inlet valves 37a, 37b direct either heated air from an auxiliary burner 32 or uncooled compressed air diverted from the compressor output prior to the aftercooler 25. As a result of exposure to the higher temperature air, the previously absorbed moisture is released from the desiccant into the higher temperature air. The regeneration air including the removed moisture is directed by regeneration air outlet valves 39a, 39b to a regeneration dump air line 40. This regeneration air is either released to a sump or to a vent.

The dumping of the regeneration air leads to a loss of the energy of compression in the compressed air and to the loss of the energy added by the auxiliary burner 32 (if used). The dumping of the regeneration air can cause a large pressure drop across the desiccant bed 34a, 34b being regenerated. Frequently, the pressure drop from the inlet to the outlet of the desiccant bed 34a, 34b is large enough to damage the desiccant bed.

The foregoing illustrates limitations known to exist in present industrial air compressor systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a Brayton cycle air compressor comprising: a combustion chamber; at least one turbine, the at least one turbine being driven by exhaust gases from the combustion chamber; and a compressor for supplying combustion air to the combustion chamber, the compressor being driven by one of the at least one turbines, the compressor having a capacity in excess of the capacity necessary to supply combustion air to the combustion chamber, the work by-product of the Brayton cycle air compressor being extracted as excess compressed air.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
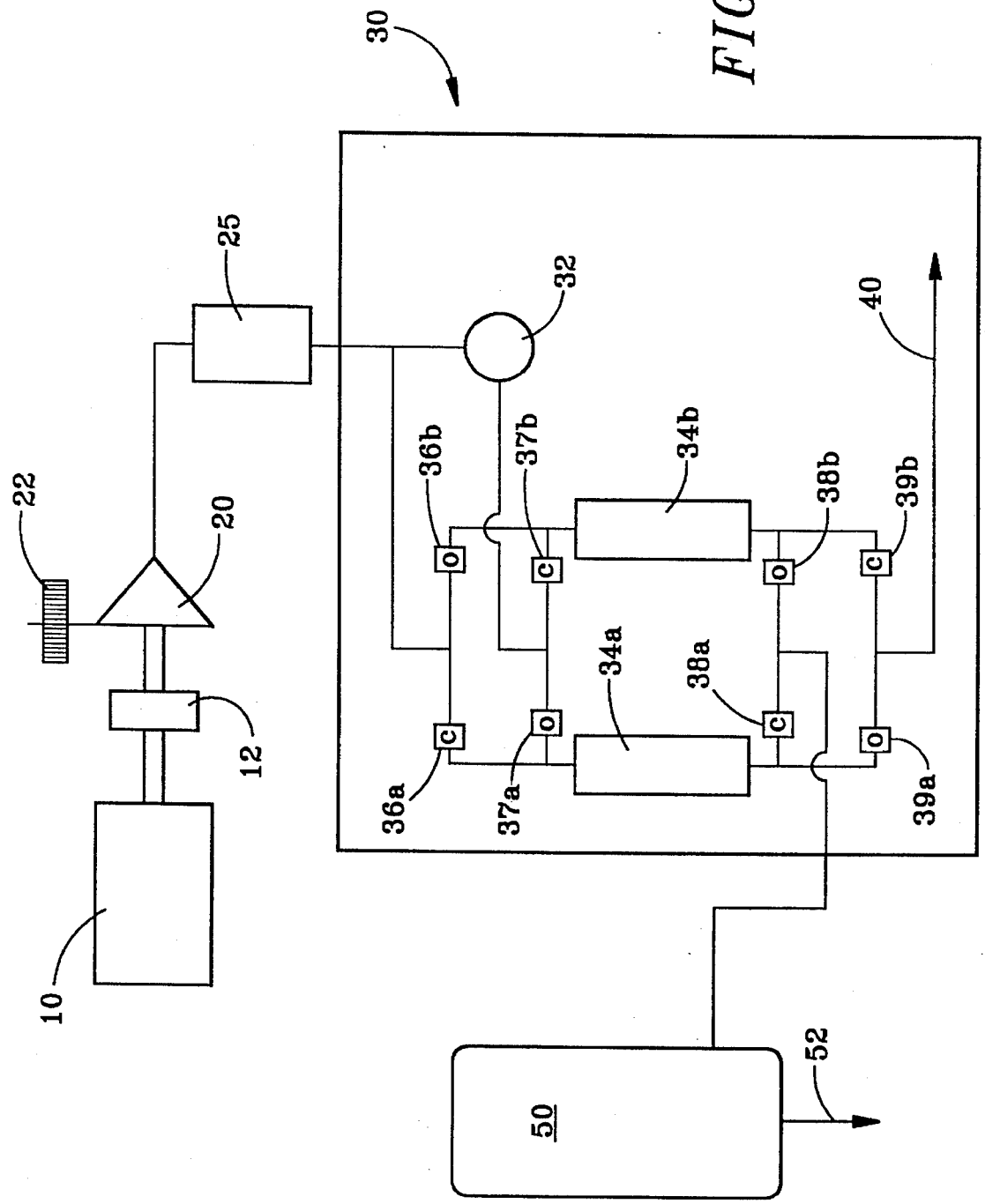
FIG. 1 is a schematic diagram of a prior art industrial air compression system.
Figure 2:
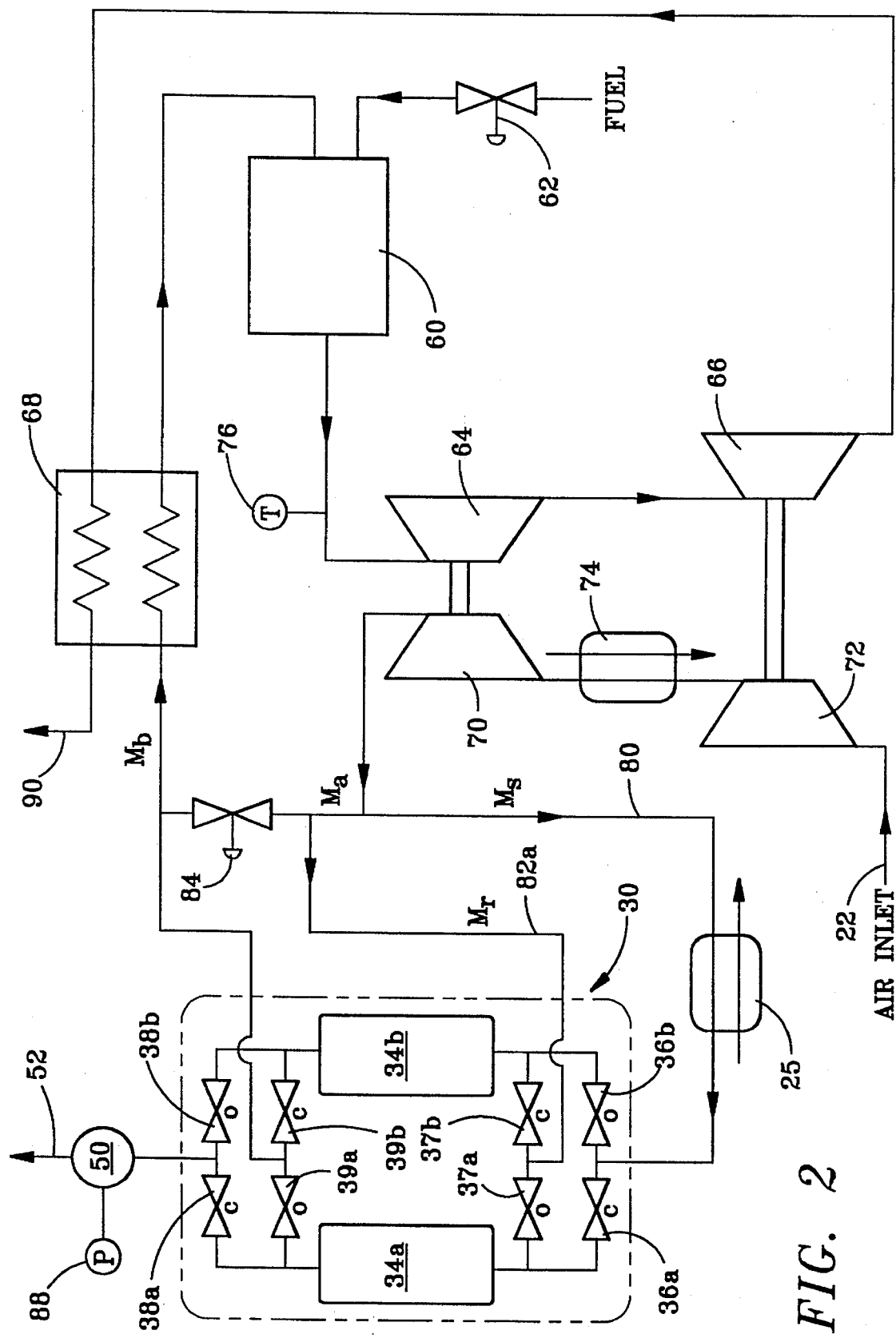
FIG. 2 is a schematic diagram of one embodiment of a Brayton cycle industrial air compression system.

FIG. 2 shows one embodiment of a Brayton cycle industrial air compressor system having a compressor section (70 and 72) (with multiple stages) that supplies air to both the gas turbine engine (60, 64 and 66) and the air receiver 50. Each compressor stage 70, 72 is driven by a dedicated turbine 64, 66 respectively. Depending on the desired discharge pressure, one, two, three or more stages of compression may be used. A fraction of the air compressed in the multi-stage compressor (70 and 72) is delivered to an air receiver 50 and air distribution system 52, usually through a dryer system 30, while the remainder of the air proceeds through the Brayton cycle components, combustion chamber 60, recuperator 68 and turbines 64, 66. This dual use of the compressors (for both supply air and combustion air) eliminates the usual mechanical connections between the engine drive and the need for a separate conventional air compressor package. In thermodynamic terms, the work by-product of the Brayton cycle is extracted as excess air compression, rather than shaft power.

One major use for this Brayton cycle industrial air compression system is to produce oil-free compressed air by using turbine driven oil-free centrifugal air compressors.

The combined use of the engine's air supply (indicated as $M_a$) to dry (or regenerate) the desiccant serving the supply air (indicated as $M_s$) is an additional efficiency and cost improvement over the conventional approach that expends a portion of compressor output for this duty. In the present invention, this drying air circuit does not result in an air loss (dump) and is a significant simplification over regenerative dryer systems that incorporate an auxiliary burner. In the present invention, the drying air and the moisture it receives are returned to the engine cycle for expansion through the driving turbines. The excess moisture is beneficial to the cycle. This return of the drying air and the acquired moisture also eliminates the common environmental problem of condensate disposal.

Typically, an industrial air compression system contains numerous condensate traps to remove condensation from the piping of the system. The condensate from these traps can also be added to the combustion air 82 where it is returned to the engine cycle. This eliminates a further environmental problem of condensate disposal.

The embodiment shown in FIG. 2 also eliminates the need for a speed control or load control (guide vanes) system. The shaft speeds of the compressors 70, 72, can be governed by the fuel throttle 62. The turbines are matched to the specifically designed compressors so that the compressors maintain an adequate margin to surge throughout the design flow conditions and so that the compressors operate within their range of maximum efficiency.

Fuel is supplied to a combustion chamber 60 through a fuel throttle valve 62. The fuel is mixed with preheated compressed combustion air 92 in the combustion chamber 60. The preferred combustion chamber is described in co-pending U.S. patent application Ser. No. 08/113,500, filed Aug. 27, 1993. The exhaust gases from the combustion chamber 60 are directed to a first stage turbine 64. A temperature sensor 76 measures the gas inlet temperature to turbine 64. The fuel supply is throttled as needed to maintain the inlet temperature between predetermined minimum and maximum limits. The exhaust from the first stage turbine 64 then enters a second stage turbine 66. The exhaust from the second stage turbine 66 passes through a counterflow recuperator 68 where the exhaust gases preheat the combustion air 82 prior to being exhausted from the system through vent 90.

Inlet air 22 is supplied to a first stage compressor 72, through an inlet air filter (not shown). The first stage compressor 72 is driven by the second stage turbine 66. The compressed air from the first stage compressor 72 is cooled in an intercooler 74 prior to entering a second stage compressor 70, which is driven by the first stage turbine 64.

Although the system shown in FIG. 2 is a two-stage system with two turbines and two compressors, the system can have a single stage or a three or more stages. In a single stage system, one compressor is driven by one turbine. In a three-stage system, a first stage compressor will be driven by a third stage turbine; a second stage compressor will be driven by a second stage turbine; and a third stage compressor will be driven by a first stage turbine. The discharge from the first stage turbine is directed to the second stage turbine and the discharge of the second turbine is directed to the third stage turbine. The discharge of the first stage compressor enters the second stage compressor and the discharge of the second stage compressor enter the third stage compressor. Air compression system having more than three stages will be similarly configured.

The discharge of the second stage compressor 70 is divided into two portions, a supply air portion $M_s$, indicated as 80, and a combustion air portion $M_a$, indicated as 82. The supply air $M_s$ is cooled in an aftercooler 25 and then enters either a receiver 50 or a drying system 30. The combustion air $M_a$ enters the recuperator 68 where it is preheated prior to entering the combustion chamber 60. At typical operating conditions, the ratio of $M_a$ to $M_s$ is 65 to 35. However, as air demand varies, this ratio can vary.

A pressure sensor 88 measures the pressure in the receiver 50. As an alternative, the pressure can be measured in the air distribution system 52. The fuel supply to the combustion chamber 60 is throttled by throttle valve 62 in response to changes in the receiver pressure. The control of throttle valve 62 by pressure sensor 88 is the primary control for the throttle valve 62. The temperature sensor 76 can override control from the pressure sensor 88 to maintain the turbine 64 inlet temperature within acceptable limits.

FIG. 2 shows an optional dryer system 30. This system operates the same as the prior art dryer system described above with one major difference. The combustion air $M_a$ is split into two portions, regeneration air 82a and a major portion 82b which passes through a throttle valve 84. The heated (heat of compression) regeneration air 82a passes through the desiccant picking up moisture from the desiccant. The regeneration air 82a, including the additional moisture, then mixes with the balance of the combustion air 82b where the combined air 82 passes through the recuperator 68. The additional moisture is beneficial to the Brayton cycle combustion chamber-turbine combination. Among the various benefits are reduced emissions, such as $NO_x$. Depending upon the quantity of drying air required and the total volume of the combustion air, all of the combustion air can be passed through the desiccant bed. For most dryer systems 30, only a portion of the combustion air $M_a$ is required to regenerate the desiccant. In this instance, throttle valve 84 is provided so that the pressure drop across throttle valve 84 matches the pressure drop across the desiccant bed 34a, 34b. This allows the regeneration air 82a to mix with the balance of the combustion air 82b. For a typical system, the regeneration flow is 15% of $M_s$.

Figure 3:
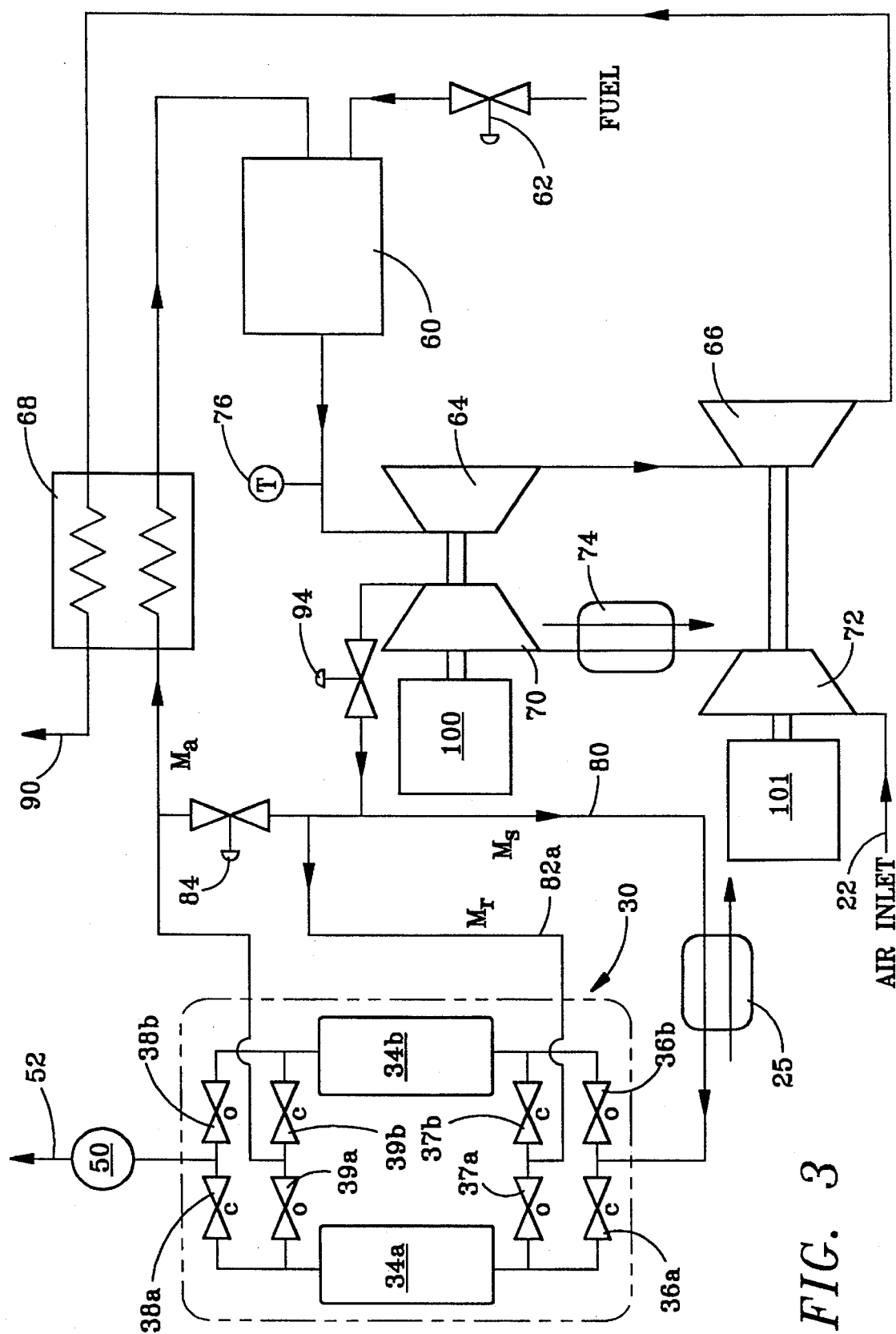
FIG. 3 is a schematic diagram of an alternate embodiment of a Brayton cycle industrial air compression system.

An alternate embodiment of a Brayton cycle air compressor system is shown in FIG. 3. An electrical generator 100, 101, such as a generator or an alternator can be connected to one or both turbines 70, 72. In one version, DC electrical generators are used. With DC generators, there is no need for speed control of the generators. If AC generators are used, either the speed must be controlled to maintain the generated electricity at 60 Hz or the AC electricity must be converted to DC and then converted back to AC at 60 Hz. With a DC generator, only the AC conversion is needed.

With one or more generators 100, 101 connected to the turbines 70, 72, the pressure control of the fuel throttle valve, as described above, is not needed. A pressure control valve 94 is added to the discharge of the second stage compressor 70. When the air receiver 50 and the air distribution system 52 pressure increases to the set point of the pressure control valve 94, the valve will begin to throttle closed. As the back pressure on the compressors 70, 72 increases, the electrical generators 100, 101 will begin to pick up load. The system shown in FIG. 3 automatically shares load, i.e., the work by-product of the Brayton cycle system, between the compressors 70, 72 and the electrical generators 100, 101. The temperature sensor 76 remains in the system to maintain the turbine inlet temperature within acceptable limits.

Having described the invention, what is claimed is:

1. An apparatus comprising:

a combustion chamber;

a supply of fuel being provided to the combustion chamber;

a first turbine which is driven by exhaust gases leaving the combustion chamber;

a second turbine which is driven by exhaust gases leaving the first turbine;

a first compressor driven by the second turbine for compressing inlet air;

a second compressor driven by the first turbine for compressing the compressed air from the first compressor, the compressed air from the second compressor being divided into two portions, the first portion being provided to the combustion chamber, this first portion defining a combustion air portion, the second portion being extracted to form a supply of compressed air, this second portion defining a supply air portion; and a means for cooling the supply air portion;

a dryer system for removing moisture from the supply air portion, the dryer system including a moisture absorption substance capable of being regenerated by the application of air having a temperature higher than the temperature of the cooled supply air portion, a further portion of the combustion air portion being applied to the moisture absorption substance for regenerating the moisture absorption substance, this portion of the combustion air portion defining a regeneration air portion.

2. The apparatus according to claim 1, further comprising:

a recuperator, the exhaust gases leaving the second turbine being provided to the recuperator, the combustion air portion passing through the recuperator prior to being provided to the combustion chamber, the exhaust gases preheating the combustion air portion.

3. The apparatus according to claim 1, wherein the regeneration air portion, including any moisture removed from the moisture absorption substance, is returned to the combustion air portion.

4. The apparatus according to claim 3, further comprising a means of controlling the pressure of the combustion air portion whereby the pressure of the combustion air portion and the pressure of the returned regeneration air portion are the same at the point where the combustion air portion and the returned regeneration air portion are mixed.

5. The apparatus according to claim 1, further comprising:

an intercooler for cooling the compressed air from the first compressor prior to entering the second compressor.

6. The apparatus according to claim 1, further comprising:

a first means for generating electricity driven by one of the first turbine or the second turbine.

7. The apparatus according to claim 6, further comprising:

a second means for generating electricity driven by the other of the first turbine or the second turbine.

8. The apparatus according to claim 6, further comprising:

a temperature control means responsive to the temperature of the exhaust gases entering the first turbine for varying the amount of fuel provided to the combustion chamber.

9. An apparatus comprising:

a combustion chamber;

a turbine, the turbine being driven by exhaust gases from the combustion chamber;

a compressor driven by the turbine for compressing air, the compressed air from the compressor being divided into two portions, the first portion being provided to the combustion chamber, this first portion defining a combustion air portion, the second portion being extracted to form a supply of compressed air, this second portion defining a supply air portion; and a means for cooling the supply air portion;

a dryer system for removing moisture from the supply air portion, the dryer system including a moisture absorption substance capable of being regenerated by the application of air having a temperature higher than the temperature of the cooled supply air portion, a further portion of the combustion air portion being applied to the moisture absorption substance for regenerating the moisture absorption substance, this portion of the combustion air portion defining a regeneration air portion.

10. The apparatus according to claim 9, wherein the regeneration air portion, including any moisture removed from the moisture absorption substance, is returned to the combustion air portion.

* * * * *